(12) United States Patent
Narikawa et al.

(10) Patent No.: US 11,843,902 B2
(45) Date of Patent: Dec. 12, 2023

(54) IMAGE FORMING MEDIUM CHANGING DEVICE, SPATIAL PROJECTION APPARATUS, SPATIAL PROJECTION SYSTEM, AND SPATIAL PROJECTION METHOD

(71) Applicant: CASIO COMPUTER CO., LTD., Tokyo (JP)

(72) Inventors: Tetsuro Narikawa, Hamura (JP); Kazuyasu Fukano, Hachioji (JP); Masaki Kobayashi, Higashiyamato (JP); Shunsuke Hara, Fuchu (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 17/691,561

(22) Filed: Mar. 10, 2022

(65) Prior Publication Data
US 2022/0295021 A1    Sep. 15, 2022

(30) Foreign Application Priority Data
Mar. 11, 2021    (JP) .................................. 2021-038822

(51) Int. Cl.
*H04N 9/31*        (2006.01)
*H04N 13/363*    (2018.01)

(52) U.S. Cl.
CPC ......... *H04N 9/3179* (2013.01); *H04N 13/363* (2018.05)

(58) Field of Classification Search
CPC ...... G03B 21/008; G03B 21/28; G03B 21/10; G03B 21/60; G03B 21/142; G03B 21/602;
(Continued)

(56) References Cited

U.S. PATENT DOCUMENTS

| 7,940,370 B2 * | 5/2011 | Barnett | G03B 25/00 352/101 |
| 2004/0119951 A1 * | 6/2004 | Vitantonio | G03B 21/145 353/119 |

(Continued)

FOREIGN PATENT DOCUMENTS

| JP | 2006091165 A | 4/2006 |
| JP | 2006-317708 A | 11/2006 |
| JP | 2013197933 A | 9/2013 |

OTHER PUBLICATIONS

First Office Action dated Apr. 24, 2023 received in Chinese Patent Application No. CN 202210235716.4.

*Primary Examiner* — Sultan Chowdhury
(74) *Attorney, Agent, or Firm* — Scully, Scott, Murphy & Presser, P.C.

(57) ABSTRACT

An image forming medium changing device includes a changing unit configured to change a characteristic of an image forming medium on which projected light is focused, wherein the projected light is refocused on an aerial space image forming section by a light guide optical system. A spatial projection apparatus including the image forming medium changing device includes multiple image forming media having different characteristics, and the changing unit is configured to be driven to dispose one image forming medium selected from the multiple image forming media on an image forming effective area interposed between a light source of the projected light and the light guide optical system.

17 Claims, 11 Drawing Sheets

(58) Field of Classification Search
CPC ............ G03B 21/2033; G03B 21/2053; G03B 21/2073; H04N 13/351; H04N 13/354; H04N 13/363; H04N 9/3141; H04N 9/3152; H04N 9/3179; H04N 9/3185; G02B 30/37; G02B 30/56; G02B 30/60
See application file for complete search history.

(56) References Cited

U.S. PATENT DOCUMENTS

| | | | |
|---|---|---|---|
| 2010/0296066 A1* | 11/2010 | Ou Yang | F21V 14/065 362/249.02 |
| 2017/0192345 A1* | 7/2017 | Somashankarappa | G03B 21/001 |
| 2019/0271943 A1* | 9/2019 | Bezirganyan | H04N 13/302 |
| 2019/0285971 A1* | 9/2019 | Okuda | G03B 21/001 |

* cited by examiner

| | 1 | 2 | 3 | 4 |
|---|---|---|---|---|
| IMAGE FORMING MEDIUM | ARC-LIKE SURFACE | WAVE | DISCONTINUITY | HUMAN |
| ZOOMING | MIDDLE | WIDE | NARROW | MIDDLE |
| FOCUSING | MIDDLE | FAR | NEAR | MIDDLE |
| IMAGE CORRECTION VALUE | | TO MATCH SCREEN | | |
| BRIGHTNESS | ORDINARY | BRIGHTLY | ORDINARY | ORDINARY |
| CONTRAST | ORDINARY | ORDINARY | STRONGLY | ORDINARY |

IMAGE FORMING MEDIUM CHANGING DEVICE, SPATIAL PROJECTION APPARATUS, SPATIAL PROJECTION SYSTEM, AND SPATIAL PROJECTION METHOD

CROSS-REFERENCE TO RELATED APPLICATION

This patent application is based upon the benefit of priority under 35 USC 119 from Japanese Patent Application No. 2021-038822 filed on Mar. 11, 2021, the entire disclosure of which, including the specification, claims, drawings and abstract, is incorporated herein by reference.

BACKGROUND OF THE INVENTION

Field of the Invention

The present invention relates to an image forming medium changing device, a spatial projection apparatus, a spatial projection system, and a spatial projection method.

Description of the Related Art

There have conventionally been disclosed spatial projection techniques for projecting an image formed by projected light in an aerial space. For example, Japanese Patent Laid-Open No. 2006-317708 (JP-A-2006-317708) discloses a mid-air floating image projection device for projecting an image in an aerial space using a configuration including a lower compartment where a projection target, which is a display image or a real thing, is disposed, a first Fresnel lens, a beam splitter, a surface reflector, and a second Fresnel lens.

SUMMARY OF THE INVENTION

An image forming medium changing device according to an embodiment of the present invention includes a changing unit configured to change a characteristic of an image forming medium on which projected light is focused, wherein the projected light is refocused on an aerial space image forming section by a light guide optical system.

A spatial projection apparatus according to the embodiment of the present invention includes the image forming medium changing device described above.

A spatial projection system according to the embodiment of the present invention includes a changing unit configured to change a characteristic of an image forming medium on which projected light is focused, wherein the projected light is refocused on an aerial space image forming section by a light guide optical system.

A spatial projection method according to the embodiment of the present invention includes changing a characteristic of an image forming medium on which projected light is focused using a changing unit, wherein the projected light is refocused on an aerial space image forming section by a light guide optical system.

DESCRIPTION OF THE EMBODIMENTS

Embodiment 1

Figure 1:
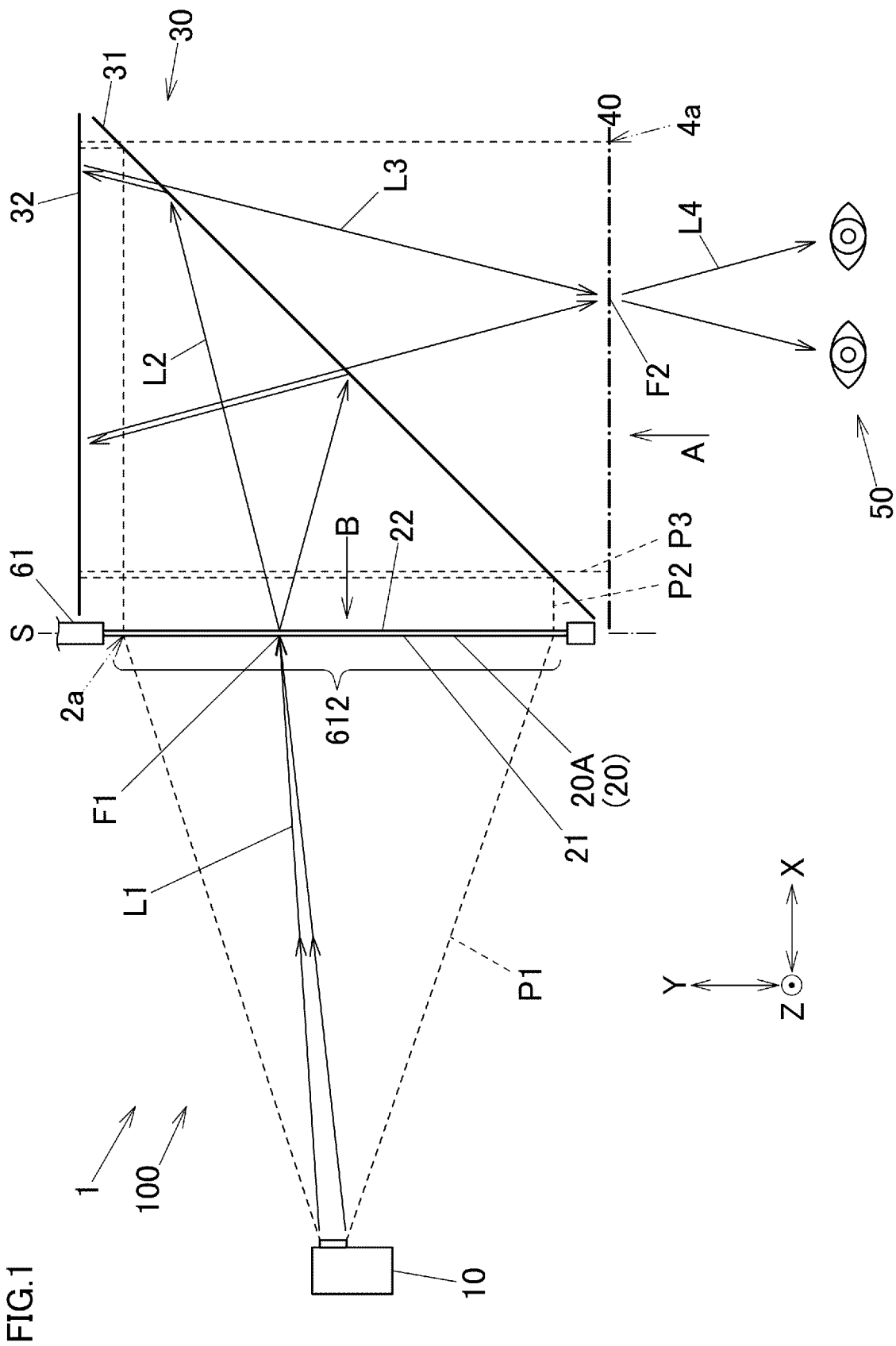
FIG. 1 is a schematic plan view of a spatial projection apparatus according to Embodiment 1 of the present invention.

Hereinafter, modes for carrying out the present invention will be described. FIG. 1 is a schematic plan view of a spatial projection apparatus 100 of a spatial projection system 1. The spatial projection apparatus 100 includes a projector 10, an image forming medium 20 onto which projected light P1 emitted from the projector 10 is shined, a light guide optical system 30 configured to guide light projected on the image forming medium 20, and an aerial space image forming section 40 on which light guided by the light guide optical system 30 is refocused. In the spatial projection apparatus 100, a projected image 2a, which is formed on the image forming medium 20 by light emitted from the projector 10, is diffuse transmitted through the image forming medium 20 and is then incident on the light guide optical system 30. Then, the projected image 2a is refocused to be reimaged on the aerial space image forming section 40 by the light guide optical system 30, whereby a spatial projected image 4a, which appears floating in a mid-air or aerial space, can be visualized by a viewer 50. In the spatial projection apparatus 100 of the present embodiment, multiple image forming media 20 are provided on a rotational wheel 61, which constitutes a changing unit (also, refer to FIG. 4), and one image forming medium 20 (an image forming medium 20A in FIG. 1) is selected from the multiple image forming media 20, so that projected light P1 is shined onto the selected image forming medium 20A. An image forming medium changing device, not shown, which includes the rotational wheel 61, is provided as a part of the spatial projection apparatus 100 in Embodiment 1, however, the image forming medium changing device may be provided as an external device which differs from the spatial projection apparatus 100.

Figure 2:
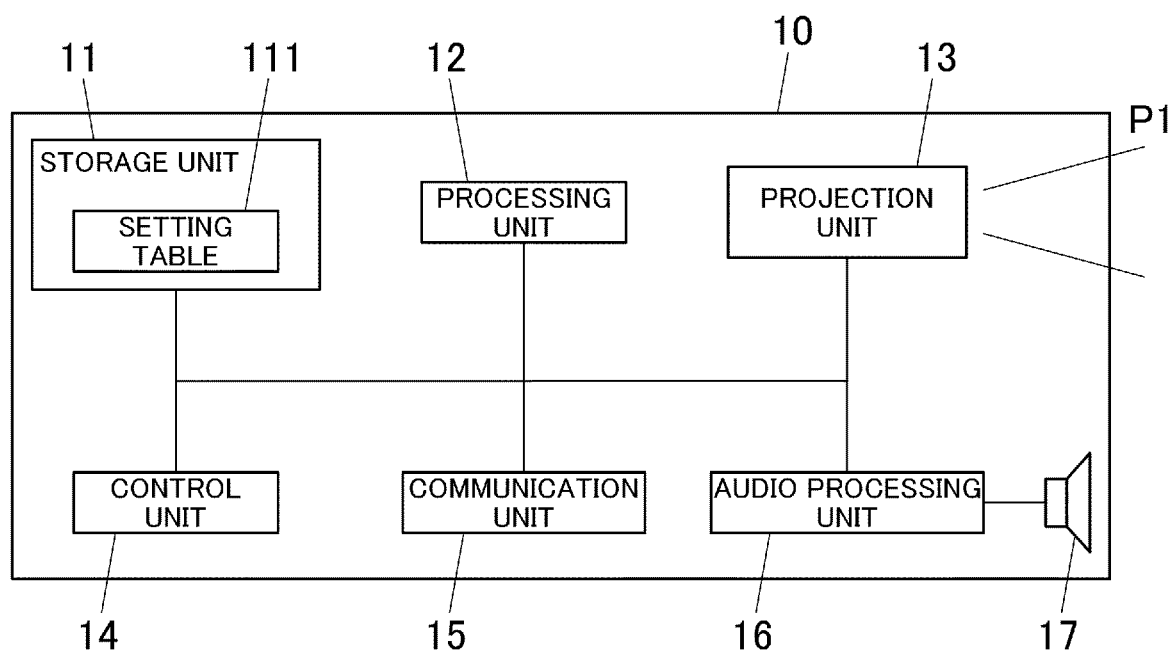
FIG. 2 is a block diagram showing the configuration of a projector according to Embodiment 1 of the present invention.

Referring to FIG. 2, the configuration of the projector 10 will be described. The projector 10 includes a storage unit 11, a processing unit 12, a projection unit 13, a control unit 14, a communication unit 15, and an audio processing unit 16, and these constituent elements are connected to one another via internal buses. The storage unit 11 is made up of a solid state driver (SSD) and a static random access memory (SRAM). The storage unit 11 stores a setting table 111, and data such as image data, video image data, a control program, and the like, which are not shown. The processing unit 12 is made up of CPU, a microprocessor, or the like and reads out the control program stored in the storage unit 11 so as to control the projector 10.

The projection unit 13 forms an image at a frame rate which comply with a preset image format based on image data sent from the processing unit 12 and emits the image so formed as projected light P1 to the outside of the projector 10. The projector 10 of the present embodiment is a projector of a digital light processing (DLP) type. In the projection unit 13, light in the blue wavelength range, light in the green wavelength range, and light in the red wavelength range are emitted from an internal light source apparatus and are then shined onto a digital micromirror device (DMD). Then, micromirror lenses (or pixels) of this DMD reflect individually the light in the blue wavelength range, the light in the green wavelength range, and the light in the red wavelength range in a time sharing fashion, whereby color image light can be produced. The image light is emitted as projected light P1 of the projector 10 to the outside thereof via a projection lens inside the projection unit 13. The projected light P1 (image light) emitted from the projection unit 13 is projected onto the image forming medium 20 shown in FIG. 1.

The control unit 14 receives a control signal from a control key or the like which is provided on a casing of the projector 10 and transmits the control signal so received to the processing unit 12 via the buses. The processing unit 12 executes various functions such as an imaging operation or the like in accordance with a control signal received from the control unit 14.

The communication unit 15 receives a control signal in the form of an infrared modulation signal or the like which is transmitted thereto from a remote controller, not shown, and then transmits the control signal so received to the processing unit 12. The communication unit 15 may include an external input terminal, so that image data can be inputted in the communication unit 15 therethrough from an external device.

The audio processing unit 16 includes a circuitry for a sound source such as a pulse code modulation (PCM) sound source or the like and drives a speaker 17 to diffuse and emit sound or voice loudly therefrom. In the case that an audio signal is included in image data which is projected, the audio processing unit 16 converts the audio signal into an analog signal when projecting the image data so as to output voice or sound loudly through the speaker 17.

The image forming medium 20 has an arbitrary shape and size which can substantially encompass a projection range of the projected light P1. Alternatively, the image forming medium 20 is disposed in an arbitrary position which includes the projection range of the projected light P1. The image forming medium 20A (20) in FIG. 1 is configured as a light transmitting plate-like film or film. The image forming medium 20 is a light transmitting member in which when the projected light P1 (including light L1) emitted from the projector 10 is shined on a first surface 21, which faces the projector 10, of the image forming medium 20, spatial image forming light P2 (also including light L2) is diffuse emitted from a second surface 22, which is opposite to the first surface 21, towards the light guide optical system 30.

As shown in FIGS. 3A to 3D, the image forming medium 20 can adopt plate-like or film-like image forming media 20B to 20E which are configured into three-dimensional planes which include arbitrarily a flat plane portion, a recessed portion and a projecting portion. In FIGS. 3A to 3D, front perspective views are schematically shown at upper parts, while plan views are schematically shown at lower parts. Although the image forming media 20B to 20E have shapes different from that of the image forming medium 20A, the image forming media 20B to 20E are configured similarly to the image forming medium 20A in function, and for example, the projected light P1 (or the line L1) shined onto the first surface 21 is emitted from the second surface 22.

Figure 3A:
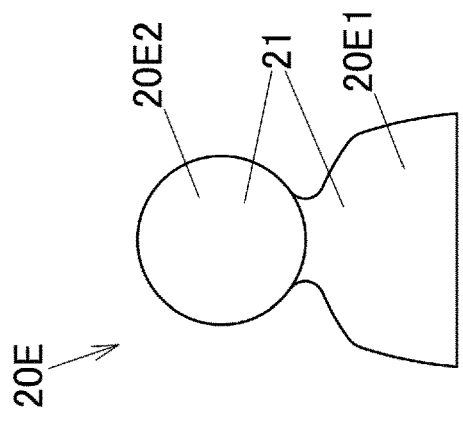
FIG. 3A is a schematic diagram of an image forming medium according to Embodiment 1 of the present invention, the image forming medium being formed into an arc-like surface.
Figure 3A:
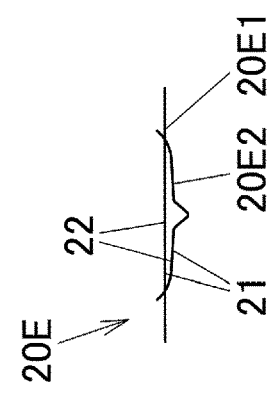
Figure 3B:
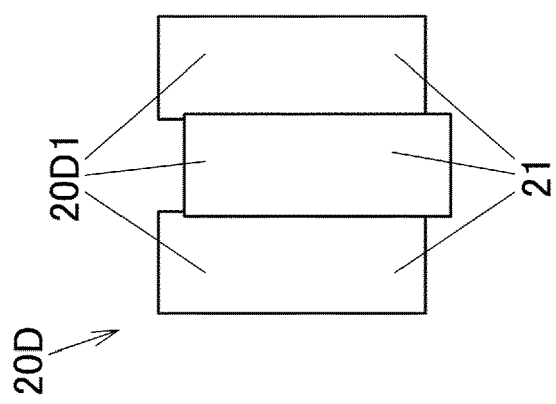
FIG. 3B is a schematic diagram of an image forming medium according to Embodiment 1 of the present invention, the image forming medium being formed into a waveform-like curved surface.
Figure 3B:
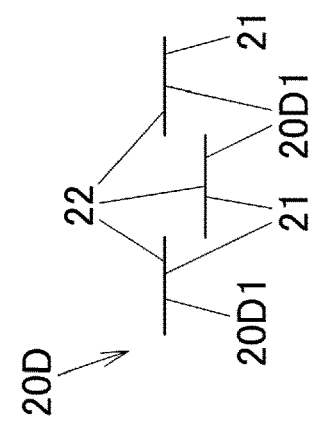
Figure 3C:
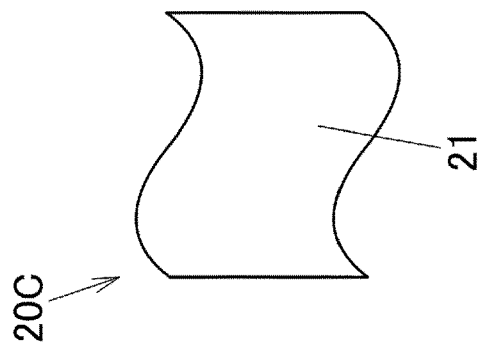
FIG. 3C is a schematic diagram of an image forming medium according to Embodiment 1 of the present invention, whose projection plane is divided into separate discontinuous projection planes.
Figure 3C:
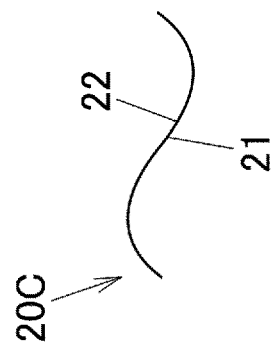
Figure 3D:
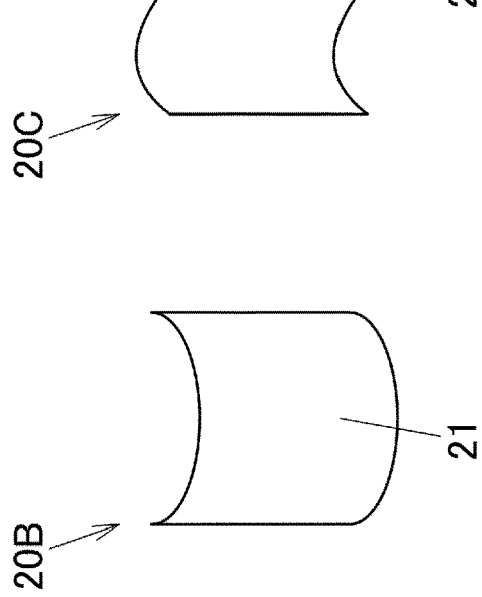
FIG. 3D is a schematic diagram of an image forming medium according to Embodiment 1 of the present invention, the image forming medium being formed into a human-shaped image forming medium.
Figure 3D:
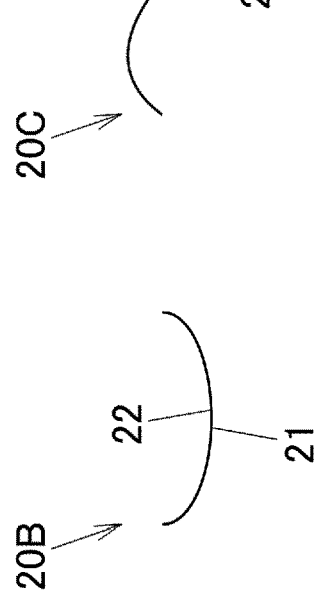

The image forming medium 20B in FIG. 3A is formed into an arc-like surface which is curved around a vertical axis (an axis in a Z-direction shown in FIG. 7 as will be described later) in such a manner that a first surface 21 projects or becomes convex and a second surface 22 is depressed or becomes concave. The image forming medium 20C in FIG. 3B is formed into a waveform-like (a sine curve-like) surface, as viewed from above, in which a first surface 21 and a second surface 22 are both curved to be concave and convex. The image forming medium 20D in FIG. 3C has multiple rectangular partial areas 20D1 which are formed by dividing a flat surface. When viewed from above, the individual partial areas 20D1 are disposed offset in such a manner as to be spaced apart from one another in front-rear and left-right directions so as to be discontinuous. The image forming medium 20E in FIG. 3D is formed into a human-like shape and has partial areas 20E1, 20E2 which imitate contours and irregularities of a human body. The partial area 20E1 imitating a torso portion has a shape made up of portions imitating shoulder portions and a portion imitating a chest portion of the human body. The partial area 20E2 corresponding to a face portion is formed into a substantially circular shape as viewed from the front, and as shown in a plan view, a projecting portion corresponding to a nose portion is provided.

Figure 4:
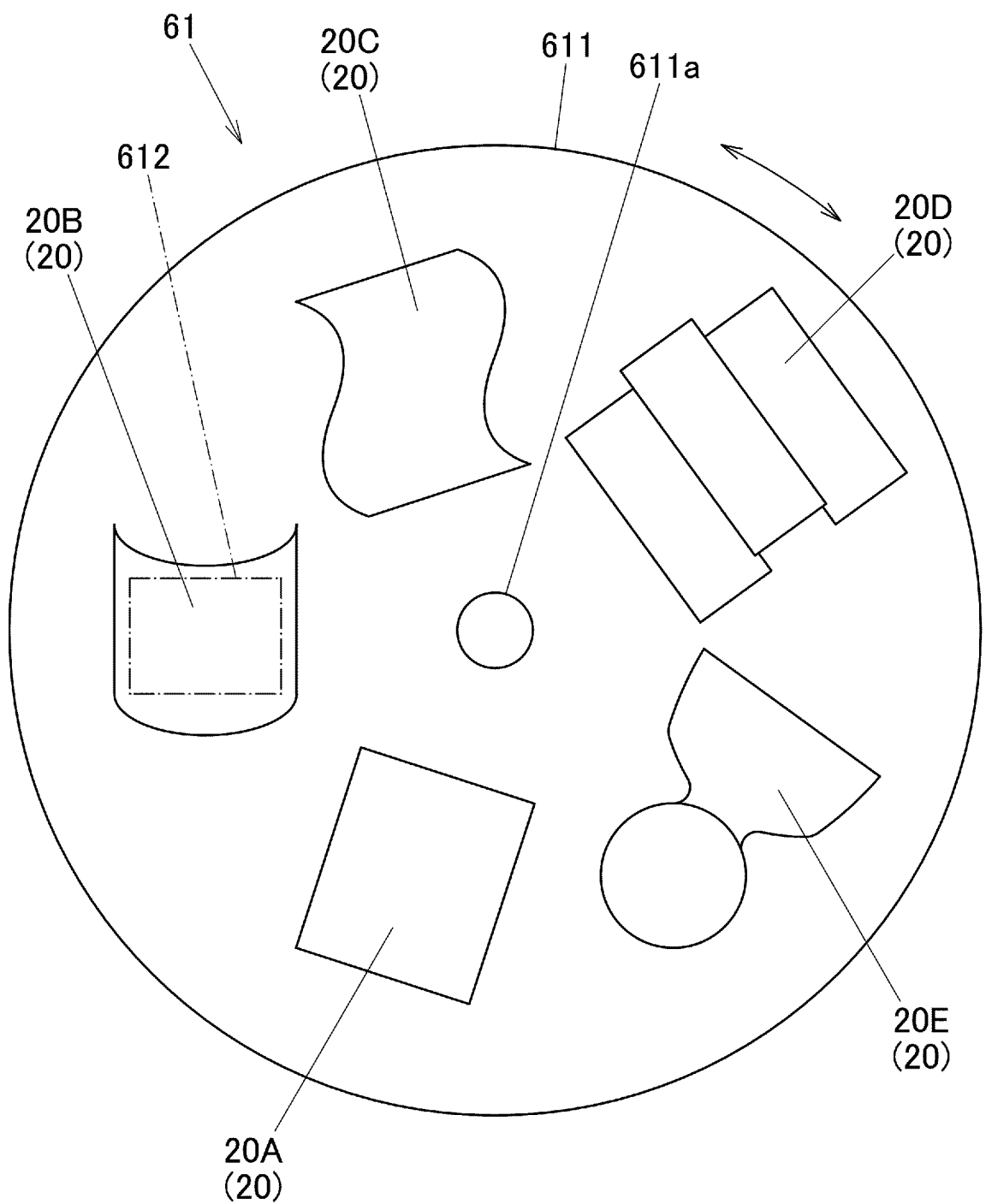
FIG. 4 is a schematic diagram of a rotational wheel according to Embodiment 1 of the present invention.

FIG. 4 is a schematic diagram of a rotational wheel 61, which is provided as a changing unit. The rotational wheel 61 has a base portion 611 which can rotate around a shaft 611a and the multiple image forming media 20A to 20E having the different characteristics, which are arranged around the shaft 611a of the base portion 611. This rotational wheel 61 is disposed so as to encompass a part or a whole of an image forming effective area 612 between the light source (the projector 10) of the projected light P1 and the light guide optical system 30. The image forming effective area 612 is an area corresponding to a range where a projected image 2a can be formed in directions (a Y-direction and a Z-direction) which are at right angles to a light axis direction (an X-direction in FIG. 1) and a projecting direction of the projected light P1 shown in FIG. 1. Size and positional relationships between the image forming effective area 612 and the image forming medium 20 in FIGS. 1 and 4 are illustrated schematically. Hence, for example, the image forming medium 20 is disposed inside the image forming effective area 612, and the projected light P1 is shined only onto the position where the image forming medium 20 exists so as to project a projected image 2a thereon. The rotational wheel 61 is configured so as to be driven to rotate around the shaft 611a so that one image forming medium selected from the multiple image forming media 20A to 20E is positioned in the image forming effective area 612. In an example shown in FIG. 4, a projected image 2a, which is formed by the projected light P1, is projected onto the image forming medium 20B, which is now positioned to match the image forming effective area 612. The driving control of the rotational wheel 61 may be executed by the processing unit 12 of the projector 10 or may be executed by another processing unit (including a driver) provided inside the spatial projection apparatus 100.

Returning to FIG. 1, the light guide optical system 30 is provided on a side of the image forming medium 20 on which the second surface 22 is provided and includes a beam splitter 31 and a retro-reflection member 32 (a retro-reflection mirror). The retro-reflection member 32 is disposed so as to be at right angles to a disposition plane S (a plane including the Y-direction (the front-rear direction) and the Z-direction (an up-down direction) in FIG. 1) of the image forming medium 20. The beam splitter 31 is formed into a flat plate-like shape and is disposed so as to be inclined at an angle of 45 degrees with respect to the disposition plane S of the image forming medium 20 and the retro-reflection member 32. The beam splitter 31 of the present embodiment is a half mirror configured to reflect a part of light incident thereon and to transmit therethrough a part of the remainder of the light. The retro-reflection member 32 has a mirror surface which reflects light incident thereon in an opposite direction which is opposite to an incident direction.

The aerial space image forming section 40 constitutes a mid-air or aerial area on which a spatial projected image 4a is displayed as a result of the projected image 2a projected onto the image forming medium 20 being emitted therefrom as spatial projected light P2 (P3) and the spatial projected light P2 (P3) being thereafter refocused on the aerial area.

Figure 5:
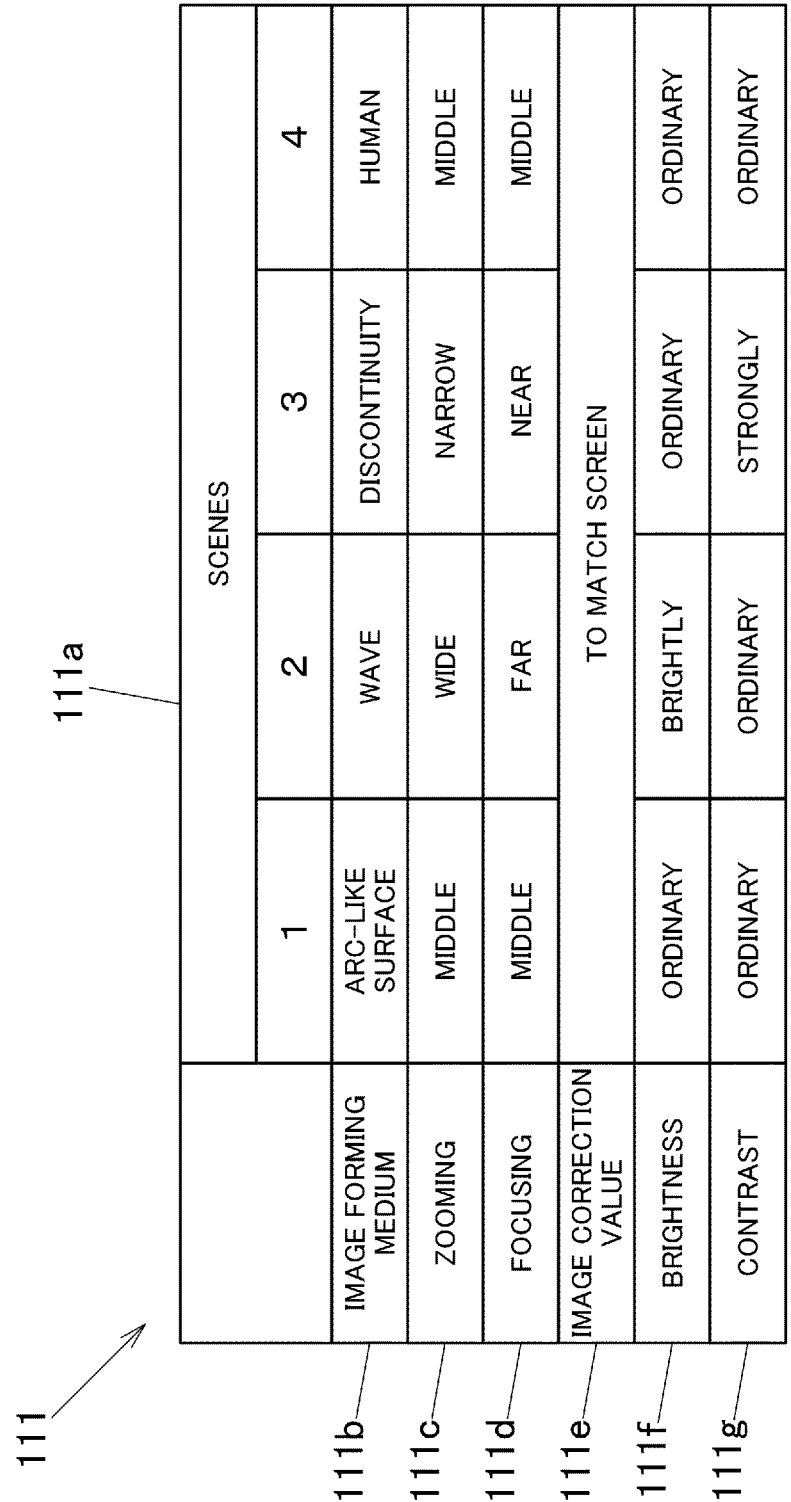
FIG. 5 is a diagram showing the configuration of a setting table according to Embodiment 1 of the present invention.

FIG. 5 is a diagram showing schematically the configuration of a setting table 111. The setting table 111 stores various settings of image forming medium 111b (screen), zooming 111c, focusing 111d, image correction value 111e, brightness 111f, and contrast 111g in association with scenes 111a. Scenes 111a-1, 111a-2, 111a-3, and 111a-4 are associated with setting details of the image forming media 20B to 20E shown in FIGS. 3A, 3B, 3C, and 3D, respectively.

Zooming 111c, focusing 111d, and image correction value 111e are set mainly in accordance with the contour and irregularities of the image forming medium 20. The image correction value 111e may be preset in association with the image forming medium 20 or may be obtained by measuring a degree of strain in a projected image 2a in such a case that the image forming medium 20 is changed through operations shown in FIGS. 8A and 8B. As to the scene 111a, an arbitrary number of scenes can be stored in advance in accordance with the number of selectable image forming media 20 or by setting multiple scenes for the image forming medium 20. Also, as to the setting items (the items such as image forming medium 111b, zooming, 111c, and the like) corresponding to the scene 111a, an arbitrary numbers of items can be stored in advance.

Next, a spatial projection method for the spatial projection apparatus 100 (the spatial projection system 1) will be described. As illustrated by a flow chart shown in FIG. 6, first of all, in step S101, the processing unit 12 receives a transition directive (a change directive) for the scenes of the projector 10 from the control unit 14 or the communication unit 15. The transition directive may be issued manually through an operation by a user or may be issued automatically in accordance with contents to be projected.

In step S102, referring to the setting table 111, the processing unit 12 obtains set values for the settings (image forming medium 111b (screen), zooming 111c, focusing 111d, image correction value 111e, brightness 111f, and contrast 111g) for the scene 111a corresponding to the transition directive so received. For example, in the case that the scene 111a-1 is selected in the previous step S101, "arc-like surface", "middle", "middle", "ordinary", and "ordinary" are obtained for set values for the image forming medium 111b, the zooming 111c, the focusing 111d, the brightness 111f, and the contrast 111g, respectively. As to the image correction value 111e, a predetermined correction parameter may be read, or a dynamic correction parameter may be calculated and obtained through the operations shown in FIGS. 8A and 8B as will be described later.

In step S103, the processing unit 12 (or another processing unit) causes the rotational wheel 61 shown in FIG. 4 to rotate to select one image forming medium from the multiple image forming media 20 (20A to 20E) which corresponds to the scene 111a-1 and switches the image forming media so that the selected image forming medium is disposed between the projector 10 and the light guide optical system 30. For the scene 111a-1, the image forming medium 20B corresponding to the "arc-like" surface is so disposed.

In step S104, the processing unit 12 causes the projection lens within the projection unit 13 to be driven so as to set the zooming to the set value (in the case of the scene 111a-1, "middle" for zooming) obtained in step S102. Similarly, in step S105, the processing unit 12 causes the projection lens to be driven to set the focusing to the set value (in the case of the scene 111a-1, "middle" for focusing) obtained in step S102.

In step S106, the processing unit 12 corrects the image data to be projected based on the image correction value 111e obtained in step S102.

In step S107, the processing unit 12 sets a tonality of the projected image 2a based on the set values (in the case of the scene 111a-1, "ordinary" for brightness 111f, "ordinary" for contrast 111g) for the brightness 111f and the contrast 111g which are obtained in step S102. Thus, the processing unit 12 reads the set values corresponding to the scene 111a selected in step S101 from the setting table 111 and executes condition settings for the image forming medium 20, the projection lens and the projected light P1.

Optical paths in projecting the spatial projected image 4a will be described by reference to FIG. 1. Light L1 is emitted from a point light source (an arbitrary point on a micromirror of the DMD (a display device)) within the projector 10 (within the projection unit 13) via the projection lens and is focused at an image forming point F1 on the image forming medium 20. Light emitted from a point light source within the projector 10 and traveling along an optical path illustrated by the light L1 to be focused is shined on the image forming medium over the shining range of the projected light P1. As a result, a projected image 2a is projected onto the image forming medium 20.

The light at the arbitrary point, which makes up the projected image 2a formed on the image forming medium 20, is diffuse transmitted through the image forming medium 20 at a predetermined diffuse angle and is then emitted from the second surface 22. For example, the light L1, which is focused at the image forming point F1, is diffused at the predetermined diffuse angle and is then incident on the beam splitter 31 as light L2. A part of the light L2 is reflected towards the retro-reflection member 32 by the beam splitter 31. That is, the light L2, which is emitted from the point light source of the projected image 2a, is guided as diffuse light along an optical path from the image forming medium 20 to the retro-reflection member 32. Since the retro-reflection member 32 reflects light incident thereon in an opposite direction opposite to the incident direction, the light L2 incident on the retro-reflection member 32 is reflected towards the beam splitter 31 as converging light which converges at an angle which is the same as the diffuse angle. Light L3 reflected on the retro-reflection member 32 is partially transmitted through the beam splitter 31 and is guided towards the aerial space image forming section 40. Then, the light L3 is refocused at an image forming point F2 on the aerial space image forming section 40. An optical path length of the light L2 is substantially the same as an optical path length of the light L3.

Then, the light L3, which is focused at the image forming point F2 on the aerial space image forming section 40, is guided as light L4 having a diffuse angle which is the same as a converging angle of the light L3 and the diffuse angle of the light L2.

The lights L1 to L4, which are originated from the point light source of the display device within the projector 10 described above, are guided over within the effective area of the optical paths of the image forming medium 20 and the light guide optical system 30. That is, projected light P1, which is a set of lights L1 emitted from point light sources of the projector 10, is shined onto the first surface 21 of the image forming medium 20 and is focused on the image forming medium 20 to thereby form an image thereon. The projected light P1, which is shined onto the image forming medium 20, is them emitted from the second surface 22 towards the beam splitter 31 as spatial projected light P2, which is a set of lights L2. A part of the spatial projected light P2 which is shined onto the beam splitter 31 is reflected towards the retro-reflection member 32. The retro-reflection member 32 reflects the spatial projected light P2 which is guided from the beam splitter 31 as spatial projected light P3 (a set of lights L3). A part of the spatial projected light P3, which is reflected by the retro-reflection member 32, passes through the beam splitter 31 and is then guided towards the aerial space image forming section 40.

In this way, the lights (the set of pint light sources) making up the projected image 2a formed on the image forming medium 20 are refocused on the aerial space image forming section 40, which constitutes a spatial or aerial space projection plane, and are then emitted towards the viewer 50. As a result, the viewer 50 can visualize the spatial projected image 4a which is imaged in an aerial space. In addition, the viewer 50 can visualize the spatial projected image 4a even when an observing point is changed. For example, the light L4 emitted from the image forming point F2 can be visualized in a position located within a diffuse angle range (within an emerging angle range) of the light L4 shown in FIG. 1.

Orientations in the up-down direction (the Z-direction) and the left-right direction (the X-direction) of the spatial projected image 4a as viewed from a direction A, which is a direction from the viewer 50 towards the aerial space image forming section 40, are substantially the same as orientations in the up-down direction (the Z-direction) and the front-rear direction (the Y-direction) of the projected image 2a as viewed from a direction B. On the other hand, since the optical path lengths of the light L2 and the light L3 are substantially the same, a depth position of the spatial projected image 4a as viewed from the direction A is in an opposite relationship with a depth position of the projected image 2a as viewed from the direction B (this will be described later by reference to FIG. 7). In the case that the image forming medium 20, which is provided as a flat plane in FIG. 1, is used, the spatial projected image 4a is also displayed as a flat image in a plan view.

Figure 7:
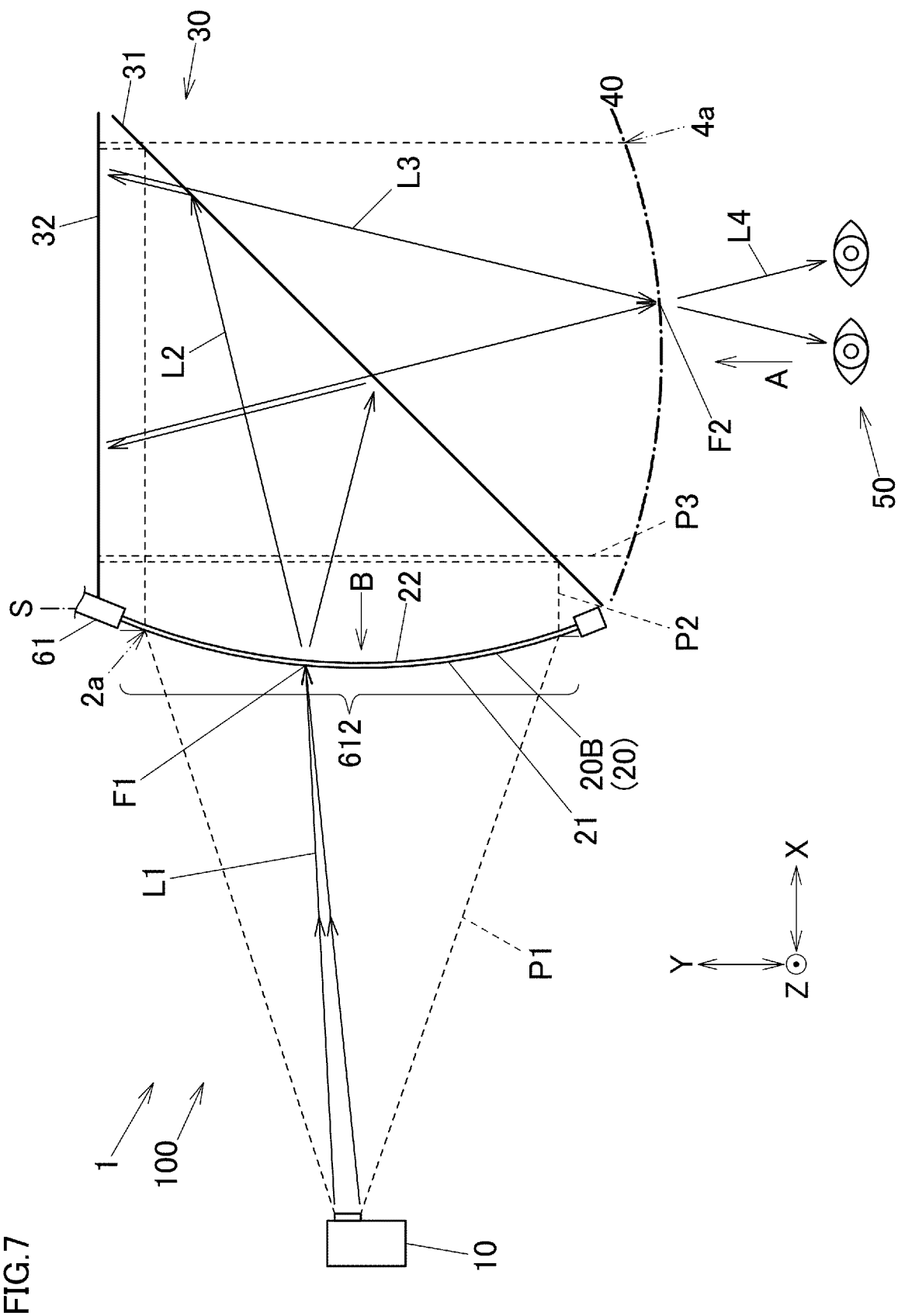
FIG. 7 is a schematic plan view of the spatial projection apparatus according to Embodiment 1 of the present invention, in which the arc-shaped image forming medium is disposed.

Next, referring to FIG. 7, a configuration will be described in which the image forming medium 20B having the arc-like surface is used in place of the image forming medium 20A shown in FIG. 1. A degree of irregularity of the image forming medium 20B is configured so as to fall within a depth of field of the projected light P1 (the light L1) emitted from the projector 10 (the same applies to the image forming media 20C to 20E). As a result, the focused projected image 2a (or the projected image 2a which appears to be focused) is displayed on the image forming medium 20B.

As has been described before, the optical path lengths of the light L2 and the light L3 which are guided by the light guide optical system 30 are substantially the same, and the depth position of the spatial projected image 4a as viewed from the direction A and the depth position of the projected image 2a as viewed from the direction B are in the opposite relationship. That is, as shown in FIG. 7, the image forming point F1 positioned on a far side of the curved projected image 2a as viewed from the direction B corresponds to the image forming point F2 positioned on a near side of the spatial projected image 4a as viewed from the direction A. As a result, the spatial projected image 4a, which is three-dimensional, can be projected on the aerial space image forming section 40 by forming the image forming medium 20B into a three-dimensional planar shape having the irregularity.

In the case that the image forming medium 20C is used as the three-dimensional image forming medium 20 having the irregularity, the spatial projected image 4a can be displayed as an image having a waveform-like irregular plane. In addition, in the case that the image forming medium 20D is used, a three-dimensional spatial projected image 4a, which is separated in the front-rear direction as viewed from the viewer 50, can be displayed. Further, in the case that the image forming medium 20E is used, a three-dimensional human-shaped image can be displayed as a spatial projected image 4a.

Figure 6:
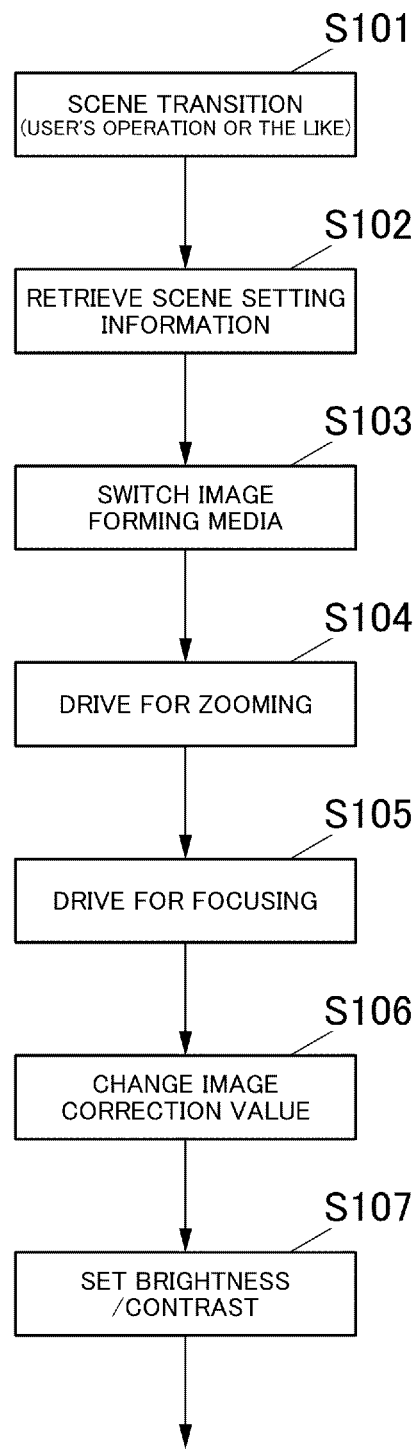
FIG. 6 is a flow chart of operations performed in executing a setting corresponding to a projection medium according to Embodiment 1 of the present invention.

Next, an operation for setting an image correction value 111e dynamically in step S106 in FIG. 6 will be described.

Figure 8A:
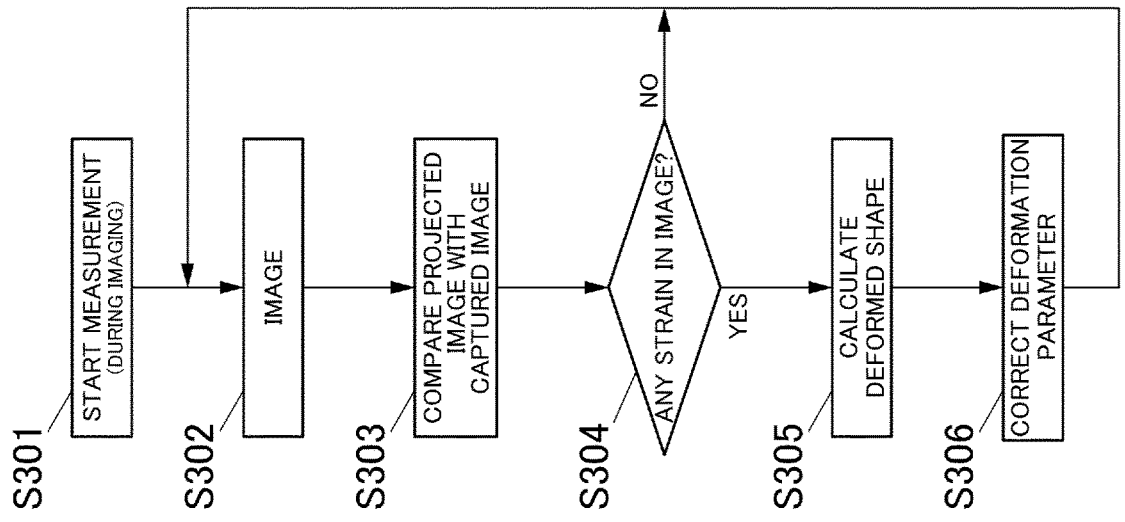
FIG. 8A is a flow chart of operations performed in setting an image correction value according to Embodiment 1 of the present invention, the flow chart specifically showing operations performed in calculating an image correction value before a projection operation is performed on an image.

An image correction value 111e is set based on a projected image 2a which is obtained by imaging the projected image 2a projected on the selected image forming medium 20. FIG. 8A shows operations performed by the spatial projection apparatus 100 for calculating an image correction value before an image projection operation. When starting a measurement of an image correction value (step S201), the processing unit 12 executes a pattern projection of a correction image on the image forming medium 20 in step S202.

Figure 9A:
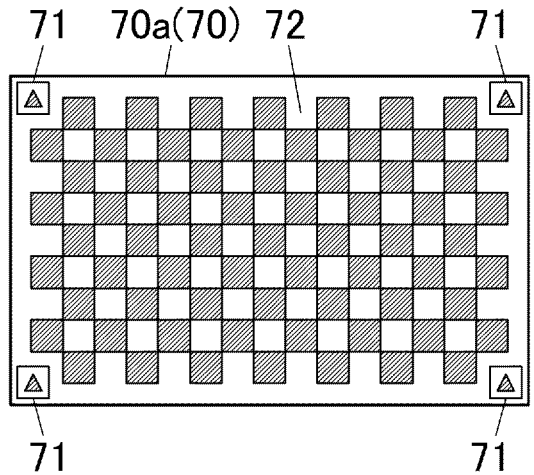
FIGS. 9A to 9C are diagrams showing individually correction images according to Embodiment 1 of the present invention, the correction images specifically showing those for correcting a strain in an imaging medium.
Figure 9B:
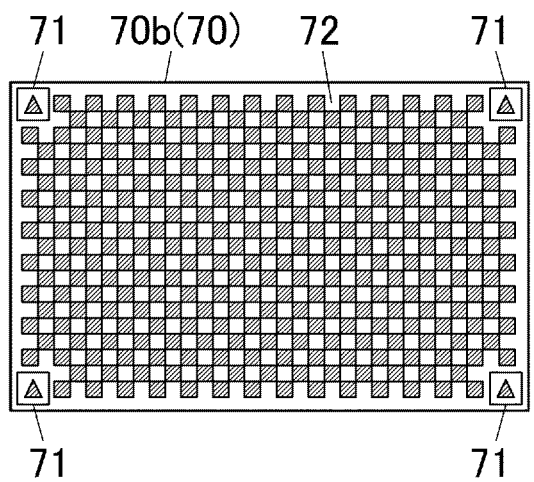
Figure 9C:
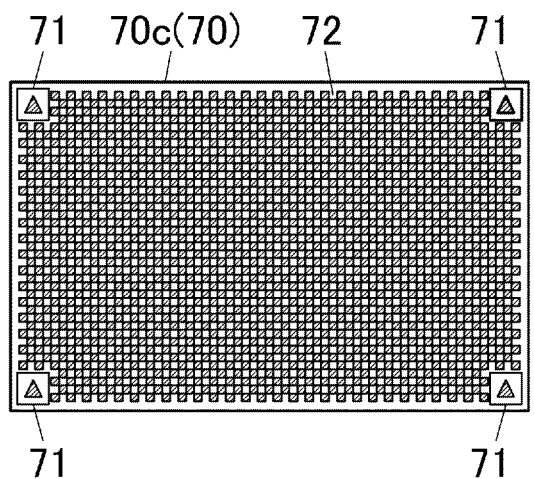

FIGS. 9A, 9B, and 9C show correction images 70a to 70c, respectively, which are used to correct a strain in a projected image 2a which is projected onto the image forming medium 20. The correction image 70a, the correction image 70b, and the correction image 70c each have a measurement image 72 over a substantially whole surface of which a checkered pattern is disposed in which white and black quadrangles, which are substantially square, are alternately disposed in a vertical direction and a horizontal direction. The correction images 70a to 70c can detect a strain in the first surface 21 with different resolving powers which differ in size of the checkered pattern. The projector 10 projects the correction images 70a to 70c onto the first surface 21 and causes an imaging device, not shown, to image the first surface 21. The imaging device can detect a strain in the whole of the first surface 21 by combining the multiple correction images 70a to 70c. The imaging device may be separate from the projector 10 or may be provided in the projector 10.

In the present embodiment, the projector 10 projects the correction image 70a having a large checkered pattern, the correction image 70b having a intermediate checkered pattern, and the correction image 70c having a small checkered pattern sequentially in this order onto the image forming medium 20. As this occurs, corner portions of the quadrangles of the individual correction images 70a, 70b, 70c having the checkered patterns which differ in size are disposed so as not to overlap each other at the time of projection.

In step S203, the correction images 70 (70a to 70c) so projected are imaged by the arbitrary imaging device provided in the projector 10. The imaging device is disposed inside the projector 10 or outside the projector 10. The imaging device may image the first surface 21 or the second surface 22 or may image the aerial space image forming section 40 from an emerging side (from a side facing the viewer 50) thereof.

In step S204, the processing unit 12 determines whether the patterns of all the correction images 70 have been projected. If the processing unit 12 determines that the patterns of all the correction images 70 have been projected and imaged (YES in S204), the processing unit 12 proceeds to an operation in step S205. On the contrary, if the processing unit 12 determines that the patterns of all the correction images 70 have not yet been projected and imaged (NO in S204), the processing step 12 returns to the operation in step S202. In the present embodiment, the projector 10 sequentially projects the correction images 70 until the projection and imaging of the three correction images 70a to 70c have been executed.

In step S205, the imaging device identifies respective positions of the correction images 70a to 70c from positions of markers 71 detected from the captured images (the correction images 70a to 70c). Specifically speaking, in the present embodiment, since the markers 71 are disposed in the same positions in four corners of each of the correction images 70a to 70c, the imaging device detects positional deviations in parallel components and rotational components of the correction images 70a to 70c by detecting positional deviations of the markers 71 among the correction images 70a to 70c. The imaging device detects multiple positional deviations of the correction images 70a to 70c for execution of an offset correction. This can correct a positional deviation between captured images which would be caused by a camera shake or the like. The imaging device detects coordinates of an intersection point (a corner portion) of the checkered patterns of the correction images 70a to 70c in the captured images so as to obtain a degree of strain in the image forming medium 20. The imaging device generates image correction information from the information on the degree of strain.

Then, in step S206, the imaging device causes the projector 10 to obtain image correction information via the communication unit 15. As a result, the projector 10 can execute an image correction operation on the image data of the contents based on the image correction information so obtained. The processing unit 12 of the projector 10 may preserve the updated image correction value (a deformation parameter) as the image correction value 111e in the setting table 111. As a result, the projector 10 can project an intended image so that the intended image can be visualized by the viewer 50.

Figure 8B:
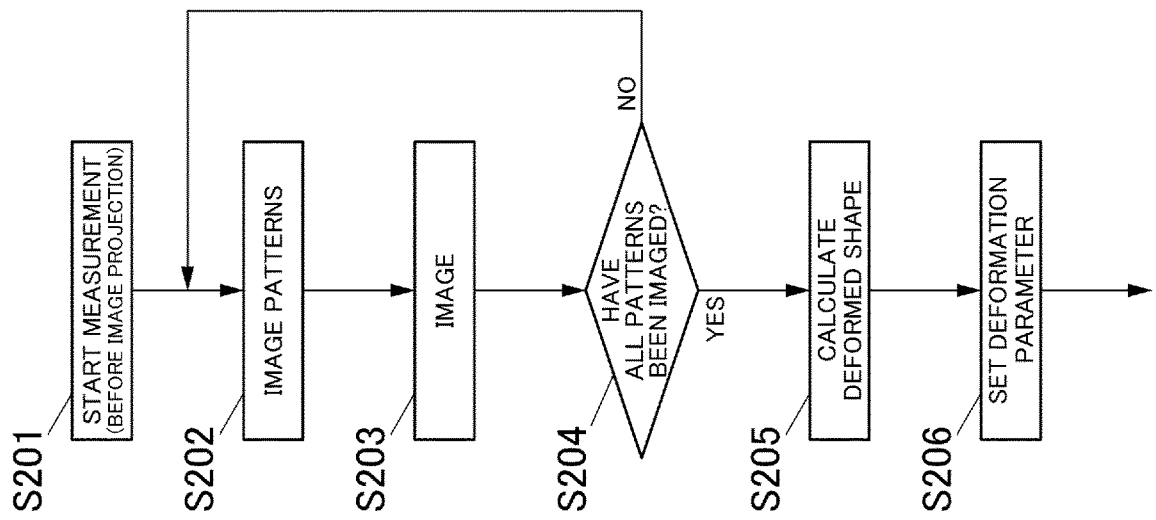
FIG. 8B is a flow chart of operations performed in setting an image correction value according to Embodiment 1 of the present invention, the flow chart specifically showing operations performed in calculating an image correction value during an image projection operation.

FIG. 8B illustrates operations performed to calculate an image correction value during an image projection operation. The spatial projection apparatus 100 can execute the operations shown in FIG. 8B in place of the operations in FIG. 8A or in combination of the operations in FIG. 8A. FIG. 8B illustrates the operations performed to calculate an image correction value during a projection of an image of the contents or the like. In step S301, the processing unit 12 is projecting an image of arbitrary contents by superposing thereon a correction image which enables a detection of coordinates while the processing unit 12 is projecting the image of the contents (the details of the projection are not shown in the figure). For example, in an image contained in the contents, a location whose position can be detected easily through a binarization operation can be made as the correction image in the image of the contents.

In step S302, the imaging device described above images the correction image to obtain a captured image. In addition, the imaging device causes the projector 10 to obtain the captured image via the communication unit 15. In step S303, the projector 10 compares the projected image containing the correction image with the captured image obtained from the imaging device.

In step S304, the projector 10 determines whether a change in the image correction value is necessary based on the comparison of the projected image with the captured image. For example, the projector 10 can determine that the change in the image correction value is necessary in the case that the shapes of the projected image and the captured image are distorted equal to or more than predetermined threshold values. If the projector 10 determines that the change in the image correction value is necessary (YES in step S304), the projector 10 proceeds to an operation in step S305, whereas if the projector 10 determines that the change in the image correction value is unnecessary (NO in step S304), the projector 10 returns to the operation in step S302.

In step S305, the projector 10 detects coordinates of the correction image in the captured image so as to obtain a degree of strain in the image forming medium 20. The projector 10 generates image correction information from the information on the degree of strain.

Then, in step S306, the projector 10 can execute an image correction operation on the image data of the contents based on the image correction information. The processing unit 12 of the projector 10 may preserve the updated image correction value (a deformation parameter) as the image correction value 111e in the setting table 111. As a result, the projector 10 can project an intended image so that the intended image can be visualized by the viewer 50.

The operations (S204 to S206 and S303 to S306) after the imaging operations in FIGS. 8A and 8B may be performed by either of the projector 10 and the imaging device or may be performed by another device which differs from the projector 10 and the imaging device.

Thus, as has been described heretofore, in the spatial projection apparatus 100 of the present embodiment, the projected image 2a which is projected as the spatial projected image 4a is formed by the projector 10. As a result, the projected image 2a can be displayed whose luminance is higher than in a case in which a display image or a real thing is used as a projection target, whereby the spatial projected image 4a can also be displayed highly brightly. In addition, the projected image 2a projected by the projector 10 can be enlarged in size by enlarging the shape of the image forming medium 20, 20A and providing an appropriate spacing distance between the projector 10 and the image forming medium 20, 20A, whereby the spatial projected image 4a can easily be enlarged in size. As a result, with the spatial projection apparatus 100, a large spatial projected image 4a can be projected without changing the overall configuration thereof largely. Further, the display form of the spatial projected image 4a can easily be changed by changing the characteristic of the image forming medium 20 by driving the rotational wheel 61. In this way, the space projection can be enabled which provides a high visual sense effect with the simple configuration by employing the spatial projection method using the spatial projection apparatus 100 (the spatial projection system 1).

Embodiment 2

Figure 10A:
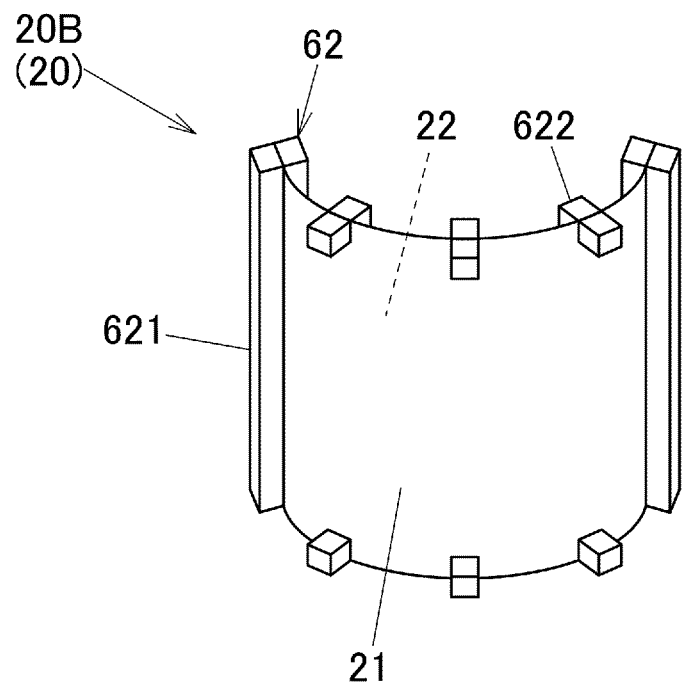
FIG. 10A is a schematic diagram of a changing unit and an image forming medium according to Embodiment 2 of the present invention, showing the image forming medium which is formed into a arc-shaped surface by the changing unit.
Figure 10B:
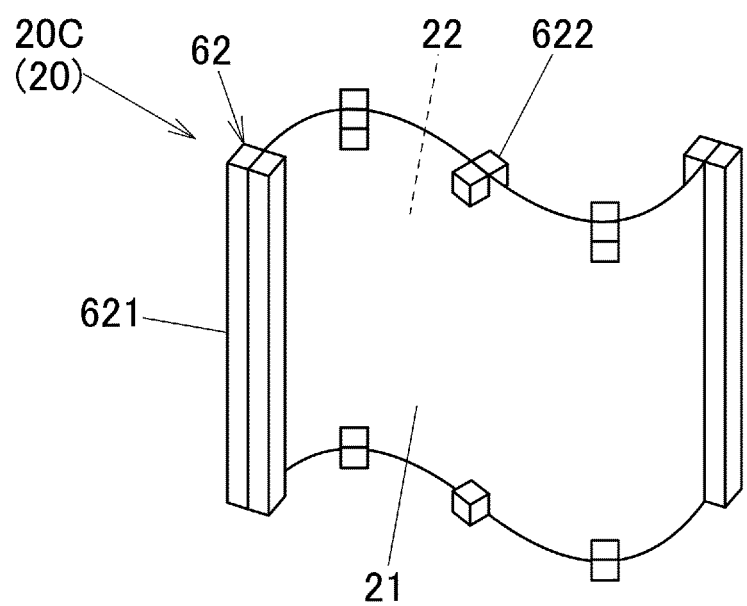
FIG. 10B is a schematic diagram of a changing unit and an image forming medium according to Embodiment 2 of the present invention, showing the image forming medium which is formed into a wave-shaped curved surface by the changing unit.

Next, referring to FIGS. 10A and 10B, the configuration of Embodiment 2 will be described. In a spatial projection apparatus 100 (a spatial projection system 1) of Embodiment 2, a shape changing unit 62 is provided as a changing unit for changing the shape of an image forming medium 20 (20A to 20E) in place of the rotational wheel 61 (refer to FIGS. 1 and 4) described in Embodiment 1. The image forming medium 20 is a rectangular flat plate-like flexible light transmitting film and is held by the shape changing unit 62. The shape changing unit 62 holds edge portions of short sides and long sides of the image forming medium 20 with multiple holding portions 621 and 622 from a first surface 21 side and a second surface 22 side of the image forming medium 20. Configurations of the holding portions 621 622 of the present embodiment are shown as an example, and a holding method including the numbers, structures, positions, ranges, and the like of the holding portions 621, 622 can be configured arbitrarily.

A part of a whole of the holding portions 621, 622 of the shape changing unit 62 can move while holding the image forming medium 20. For example, an image forming medium 20B shown in FIG. 10A has an arc-like surface shape, and an image forming medium 20C shown in FIG. 10B has a waveform-like surface shape. The shape of the image forming medium 20 can be changed by the shape changing unit 62, whereby the image forming media having the different shapes can be formed by the single member. As a result, the configuration of the changing unit for changing the characteristic of the image forming medium can be miniaturized, whereby the spatial projection apparatus 100 (100A) can be configured simply. Although an image forming medium changing device, not shown, which includes the shape changing unit 62 is provided as part of the spatial projection apparatus 100 in Embodiment 2, the image forming medium changing device may be provided as an external device which differs from the spatial projection apparatus 100.

The light guide optical system 30 described in Embodiment 1 and Embodiment 2 that have been described heretofore may adopt a configuration which differs from the configuration in which the light guide optical system 30 includes the beam splitter 31 and the retro-reflection member 32. For example, a spatial projection apparatus 100A of a spatial projection system 1A shown in FIG. 11 includes a light guide optical system 30A including a light reflection member 33 in place of the light guide optical system 30 of the spatial projection system 100 of Embodiment 1 and Embodiment 2. The light reflection member 33 is an optical member for refocusing individual point light sources which are focused on an image forming medium 20 (for example, light from an image forming point F1) on an aerial space image forming section 40 which is positioned planar symmetric with the image forming medium 20 with respect to the light reflection member 33.

Although the light reflection member 33 can adopt an arbitrary configuration, as shown in an enlarged view of a portion C, for example, the light reflection member 33 is made up of a first mirror layer 331 including multiple first mirrors 331a and a second mirror layer 332 including multiple second mirrors 332a, the first mirror layer 331 and the second mirror layer 332 being disposed adjacent to each other. The first mirror 331a is disposed in such a manner that a mirror surface thereof is disposed parallel to an XY plane. In addition, the multiple first mirrors 331a are aligned at equal intervals in the Z-direction in such a manner as to be parallel to one another (also refer to a sectional view taken along a line XI-XI). The second mirror 332a is disposed in such a manner that a mirror surface thereof is at right angles to the mirror surface of the first mirror 331a. In addition, the multiple second mirrors 332a are aligned at equal intervals in a direction which is at right angles to the direction in which the first mirrors 331a are aligned in such a manner as to be parallel to one another. The light reflection member 33 is disposed in such a manner that the second mirrors 332a are inclined at an angle of 45 degrees with respect to a disposition surface S of the image forming medium 20 (with respect to a YZ plane and a ZX plane in the example shown in FIG. 11).

In addition, in the enlarged view of the portion C, optical paths of lights L21, L22, which are emitted from the image forming point F1 and are parallel to the XY plane, are shown when the lights L21, L22 are incident on the light reflection member 33. The lights L21, L22 are not shined onto the mirror surfaces of the first mirrors 331a which are disposed parallel to the XY plane but are incident on the mirror surfaces of the second mirrors 332a. The lights L21, L22 are reflected at reflection angles which are equal to incident angles at which the lights L21, L22 are incident on the second mirrors 332a. Since the light L21 is incident on the second mirror 332a (the light reflection member 33) at a larger incident angle than that of the light L22 at which the light L22 is incident on the second mirror 332a, the light L21 is reflected at a larger reflection angle than that of L22 at which the light L22 is reflected. As a result, a light L2 having a predetermined diffuse angle, which is emitted from the image forming point F1, is reflected at the light reflection member 33 as a light L3 having a convergence angle which is equal to the diffuse angle of the light L2 and is then focused at an image forming point F2 which is positioned planar symmetric with the image forming point F1 with respect to the light reflection member 33. In addition, since a Z-direction component of the light L2 emitted from the image forming point F1 is also reflected at the first mirror 331a, the Z-direction component of the light L2 is also focused at the image forming point F2.

The configuration of the light reflection member 33 is not limited to the configuration shown in the enlarged view of the portion C, and hence, the light reflection member 33 may employ other light reflecting elements which can refocus the individual point light sources focused on the image forming medium 20 at the aerial space image forming section 40 which is positioned planar symmetric with the image forming medium 20 with respect to the light reflection member 33. For example, the light reflection member 33 may be configured as a light reflection member in which multiple minute prisms are provided so as to reflect light incident thereon at a predetermined diffuse angle as light which converges at a convergence angle which is substantially the same as the diffuse angle, so that the light incident on the light reflection member form the point light source is emitted therefrom so as to be focused at the position which is planar symmetric with the image forming point at which the point light source is focused.

Figure 11:
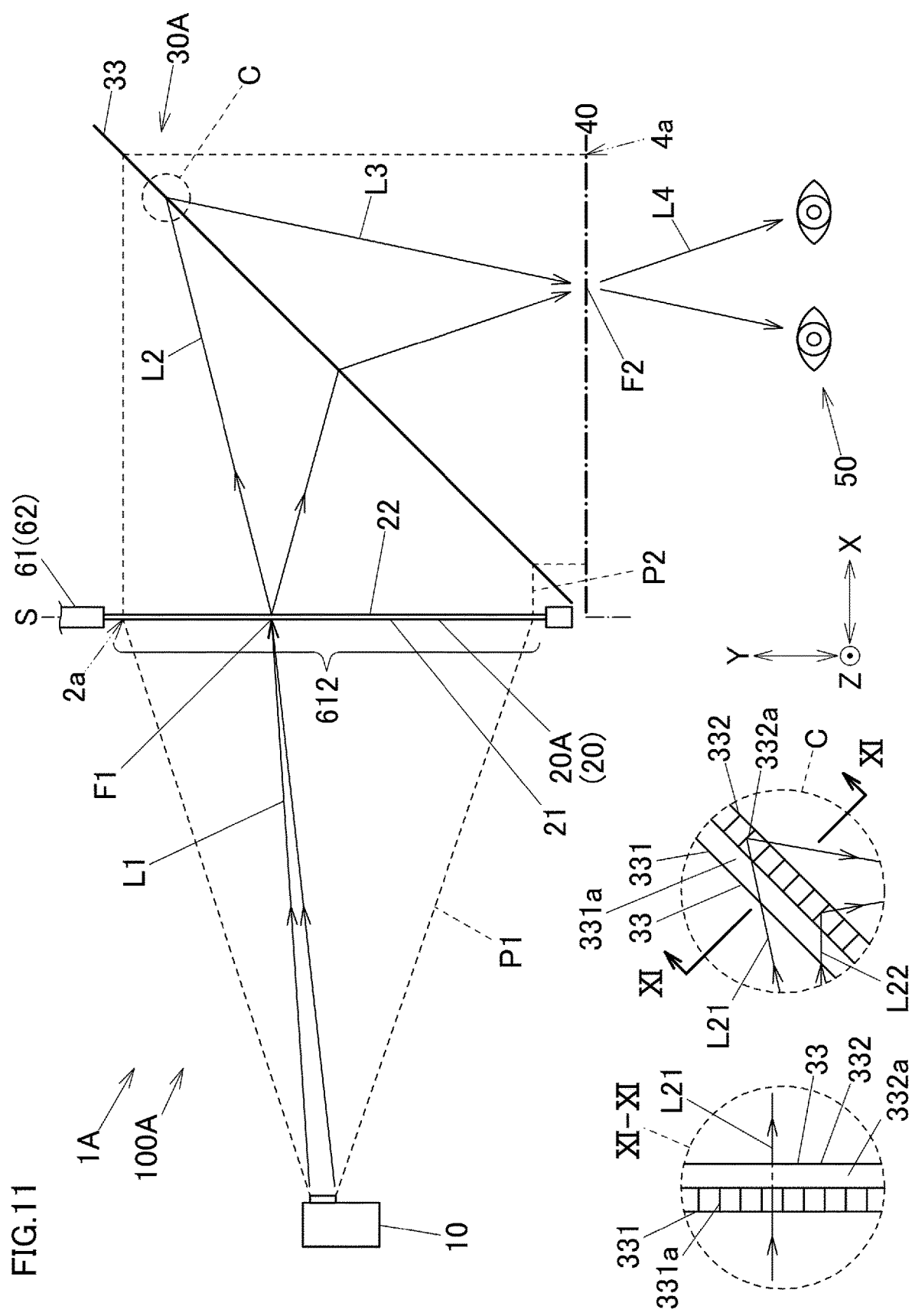
FIG. 11 is a schematic plan view of a spatial projection apparatus having a light guide optical system that can be applied to both the embodiments of the present invention.

Thus, as has been described heretofore, with the spatial projection apparatus 100A and the spatial projection system 1A shown in FIG. 11, since the number of components involved in the light guide optical system 30A can be reduced compared with the light guide optical system 30 of Embodiment 1, so that the light guide optical system 30A can be configured simple, the overall size of the spatial projection apparatus 100A (the spatial projection system 1A) can be reduced accordingly. As a result, the space projection can be enabled which provides a high visual sense effect with the simple configuration.

In the spatial projection apparatus 100, 100A described in each of the embodiments, the projector 10, the imaging device (not shown), the image forming medium 20, the light guide optical system 30, 30A, and the aerial space image forming section 40 may be configured so as to be disposed altogether within one device or may be configured so as to be dispersed into multiple devices. For example, the projector 10 can be configured as a single projector including some of the functions of the image forming medium 20 (20A to 20E), the light guide optical system 30, 30A, and the aerial space image forming section 40.

The characteristic of the image forming medium 20 described in each of the embodiments can include the number and disposing positions of partial areas, the shapes of irregularity, contour, and the like, light transmittance (selected for each wavelength), the diffuse angle of light directed towards the light guide optical system 30, and the like.

The projector 10 is not limited to the DLP system, and hence, the projector 10 may adopt other systems. A projector employing a liquid crystal panel or of an LCP type may be employed as the projector 10. In the LCP-type projector, the transmittances of light in the blue wavelength range, light in the green wavelength range, and light in the red wavelength range are controlled for each pixel by a liquid crystal filter (a liquid crystal plate), and the light in the blue wavelength range, the light in the green wavelength range, and the light in the red wavelength range from individual pixels which have been transmitted through the liquid crystal filter are combined together so as to be emitted as projected light.

In addition, a projector employing a liquid crystal on silicon system or of an LCoS type may be employed as the projector 10. In the LCoS-type projector, a display device having a liquid crystal filter (a liquid crystal layer) which can change the transmittance of light for each pixel (and also can cut off light) is disposed on a reflection layer. As a result, the projector reflects light source light shined on the display device while controlling the amount of light for each pixel so as to form image forming light. The image forming light so formed is then emitted to the outside as projected light, whereby a projected image 2a can be projected on the image forming medium 20 (20A to 20E).

In the examples in which the LCP-type projector and the LCoS-type projector are used as the projector 10, the individual blue, green, and red lights (the light in the blue wavelength range, the light in the green wavelength range, and the light in the red wavelength range) are polarized light having a predetermined polarizing direction. As a result, for example, in Embodiment 1, a polarizing mirror, which is configured to reflect one of an S-polarized light and a P-polarized light and to transmit the other thereof may be disposed as the beam splitter 31, and a quarter-wave plate may be disposed between the beam splitter 33 and the retro-reflection member 32. As a result, the beam splitter 33 reflects, in the lights emitted from the image forming medium 20, a light in a first polarizing direction, which is one of the S-polarized light and the P-polarized light, towards the retro-reflection member 32, and the light so reflected is passed through the quarter-wave plate to be converted into a circular polarized light, whereafter the circular polarized light is reflected by the retro-reflection member 32. The circular polarized light, which is reflected by the retro-reflection member 32, passes through the quarter-wave plate again to thereby be converted into a light in a second polarizing direction which is at right angles to the first polarizing direction, and the light in the second polarizing direction then passes through the beam splitter 31. In this way, in the case that the polarizing mirror is used as the beam splitter 31, since most of the light which is reflected once by the beam splitter can be passed through the beam splitter after having been reflected by the retro-reflection member 32, the utilization efficiency of light can be increased compared with the case in which the half mirror is used.

A projector of a laser scanning type may be employed as the projector 10. In the laser scanning-type projector, a laser beam, which is a color mixture of a desired color produced by combining light in the blue wavelength range, light in the green wavelength range, and light in the red wavelength range, is shined onto the display device, and the display device reflects the laser beam so shined thereon while controlling the reflection angle in a time sharing fashion and shines the laser beam on the image forming medium 20, which constitutes a projection target object. As this occurs, the display device shines the laser beam in such a manner as to scan the image forming medium 20 two-dimensionally in a vertical direction and a horizontal direction, whereby the display device can project a projected image 2a on the image forming medium 20. With the laser scanning-type projector, since the projection lens for collecting light emitted from the display device can be omitted, the overall size of the projector can be made small. In addition, with this projector, since an image can be formed by the laser beam, even in the case that a three-dimensional image forming medium whose irregularity is great is used, an intended clear projected image 2a can be projected.

While the configuration is described in which the image forming medium 20 adopts the plate-like flexible film, smoke or fluid such as water or the like may be employed as the image forming medium 20. In the case that a fluid is employed for the image forming medium 20, a light transmitting container in which the fluid is confined may be disposed on the rotational wheel 61, or a light transmitting flexible plate-like container in which the fluid is confined may be held by the shape changing unit 62.

In addition, the image forming medium 20 may be colored. As a result, the color of the spatial projected image 4a can be changed, or the perceived color thereof can be adjusted arbitrarily. In the case that the fluid is employed as the image forming medium 20, the fluid may be colored. The coloring of the image forming medium 20 may be changed over time in time series. As a result, various dramatic effects can be expressed.

The light guide optical system 30 may be configured so that light emitted from the image forming medium 20 is refocused on the aerial space image forming section 40 using a Fresnel lens.

In the embodiments that have been described heretofore, the image forming medium 20 is described as the light transmitting image forming medium in which the projected light P1, which is projected onto the image forming medium 20, is incident from the first surface 21, emerges from the second surface 22, and is guided towards the light guide optical system 30 as the spatial projected light P2. However, the image forming medium 20 may adopt a reflection-type image forming medium (a projection target medium such as a projector screen, a wall surface, or the like) in which the projected light P1 is incident on and emerges from the same surface.

The projected image 2a formed on the image forming medium 20 by the projected light P1 is not limited to the image formed by the projected light emitted from the projector 10, and hence, the projected image 2a may be an optical image formed by arbitrary light source light emitted from another light source device as projected light, illumination light, LED light or laser light. Alternatively, the projected image 2a may be formed by visible light by using an arbitrary light source or may be formed by non-visible light (for example, for use as a digital watermark or the like).

Thus, as has been described heretofore, the image forming medium changing device of the spatial projection system 1, 1A and the spatial projection apparatus 100, 100A described in each of the embodiments includes the changing unit (61, 62) for changing the characteristic of the image forming medium 20 (20A to 20E) on which the projected light is focused, wherein the projected light is refocused on the aerial space image forming section 40 by the light guide optical system 30, 30A. As a result, the display mode of the spatial projected image 4a can be set arbitrarily based on the characteristic of the image forming medium. This enables the spatial projection which provides a high visual sense effect.

With the spatial projection apparatus 100, 100A having the image forming medium 20 (20A to 20D), the overall configuration including the changing unit (61, 62) can be made small in size.

With the spatial projection apparatus 100, 100A having the light guide optical system 30, 30A, the overall configuration including the changing unit (61, 62) can be made small in size.

With the spatial projection apparatus 100, 100A including the multiple image forming media 20A to 20E having the different characteristics and configured so that the changing unit (61, 62) can be driven to dispose one image forming medium selected from the multiple image forming media 20A to 20E in the image forming effective area interposed between the light source of the projected light and the light guide optical system 30, 30A, the image forming media 20A to 20E can easily be changed by replacing the prepared image forming media 20A to 20E.

With the spatial projection apparatus 100, 100A in which the changing unit is the rotational wheel 61 which is made up of the base portion 611 which can rotate around the shaft 611a and the multiple image forming media 20A to 20E which are arranged around the shaft 611a of the base portion 611, the switching among the image forming media 20A to 20E can easily be executed.

With the spatial projection apparatus 100, 100A in which the changing unit is the shape changing unit 62 which can change the shapes of the image forming media 20A to 20E, the image forming media 20 having the different shapes can be formed by the single member. As a result, the configuration of the changing unit for changing the characteristic of the image forming medium can be made small in size, whereby the spatial projection apparatus 100 (100A) can be configured simply.

The spatial projection apparatus 100, 100A is described as including the storage unit 11 configured to store the setting table 111 in which the set value or values of at least part of zooming 111c, focusing 111d, image correction value 111e, brightness 111f and contrast 111g are associated with the image forming medium 111b (20) and the processing unit 12 configured to read the set values corresponding to the selected image forming medium 20 for setting conditions. As a result, the spatial projection apparatus 100, 100A can project the spatial projected image 4a based on an arbitrary setting in accordance with a preference of the viewer 50 (the user).

The image correction value 111e is set based on the captured image corresponding to the projected image 2a which is obtained by imaging the projected image 2a projected on the selected image forming medium 20. As a result, the image correction value with which an appropriate spatial projected image 4a can be projected in accordance with the image forming medium 20 in use can be set dynamically without determining the image correction value in advance.

With the spatial projection apparatus 100, 100A including the image forming medium 20 which is formed into the three-dimensional shape including irregularity, the three-dimensional spatial projected image 4a can be displayed.

The image forming media 20A to 20E are the light transmitting member in which the projected light P1 is shined onto the first surface 21, and the light is diffuse emitted towards the light guide optical system 30, 30A from the second surface 22 which is the opposite surface to the first surface 21. As a result, the configuration including the image forming media 20A to 20E and the light guide optical system 30, 30A can be made small in size.

The light guide optical system 30 is described as including the beam splitter 31 and the retro-reflection member 32, and the beam splitter 31 is described as reflecting the light emitted from the image forming media 20A to 20E towards the retro-reflection member 32 and transmitting the light reflected on the retro-reflection member 32 therethrough towards the aerial space image forming section 40. As a result, the light emitted from each of the point light sources on the projected image 2a and diverging at a wide angle can be formed simply.

With the spatial projection apparatus 100, 100A including the projector 10 configured to project projected light, the light source of the projected image 2a (4a) can be included in the spatial projection apparatus 100, 100A, whereby the overall size thereof can be made small.

The characteristic of the image forming medium 20 (20A to 20E) on which the projected light is focused, wherein the projected light is refocused on the aerial space image forming section 40 by the light guide optical system 30, 30A is described as being changed by the changing unit (61, 62). As a result, the display mode of the spatial projected image 4a can be set arbitrarily based on the characteristic of the image forming medium 20 (20A to 20E). This enables the spatial projection which provides a high visual sense effect.

The embodiments that have been described heretofore are presented as examples, and hence, there is no intention to limit the scope of the present invention by those embodiments. These novel embodiments can be carried out in other various forms, and various omissions, replacements, and modifications can be made thereto without departing from the spirit and scope the invention. These embodiments and their variations are included in the spirit and scope of the invention and are also included in scopes of inventions set forth under claims and their equivalents.

What is claimed is:

1. A spatial projection apparatus comprising:
   an image forming medium on which projected light is focused;
   a changing unit configured to change a characteristic of the image forming medium; and
   a light guide optical system configured to refocus the projected light emitted from the image forming medium on an aerial space image forming section,
   wherein the image forming medium comprises a light transmitting member in which the projected light is shined on a first surface of the light transmitting member, and light is diffuse emitted towards the light guide optical system from a second surface of the light transmitting member opposite to the first surface.

2. The spatial projection apparatus according to claim 1, further comprising:
   a multiplicity of the image forming medium having different characteristics,
   wherein the changing unit is configured to be driven to dispose one image forming medium selected from the multiplicity of the image forming media on an image forming effective area interposed between a light source of the projected light and the light guide optical system.

3. The spatial projection apparatus according to claim 2, wherein the changing unit comprises:
   a shaft; and
   a rotational wheel comprising a base portion configured to rotate around the shaft, and
   wherein the multiplicity of the image forming medium are arranged around the shaft.

4. The spatial projection apparatus according to claim 1, wherein the changing unit comprises a shape changing unit configured to change a shape of the image forming medium.

5. The spatial projection apparatus according to claim 1, further comprising:
   a storage unit configured to store a setting table in which a set value for at least a part of zooming, focusing, image correction value, brightness, and contrast is associated with the image forming medium; and
   a processing unit configured to read the set value associated with the image forming medium from the setting table for setting a condition.

6. The spatial projection apparatus according to claim 5, wherein the image correction value is set based on a captured image associated with a projected image projected on the image forming medium which is obtained by imaging the projected image.

7. The spatial projection apparatus according to claim 1, wherein the image forming medium is formed into a three-dimensional surface shape including irregularity.

8. The spatial projection apparatus according to claim 1, wherein the light guide optical system comprises a beam splitter and a retro-reflection member, and
   wherein the beam splitter is configured (i) to reflect light emitted from the image forming medium towards the retro-reflection member and (ii) to transmit light reflected by the retro-reflection member therethrough towards the aerial space image forming section.

9. The spatial projection apparatus according to claim 1, comprising:
   a projector configured to project the projected light.

10. A spatial projection apparatus comprising:
    an image forming medium on which projected light is focused;
    a changing unit configured to change a characteristic of the image forming medium;
    a light guide optical system configured to refocus the projected light emitted from the image forming medium on an aerial space image forming section;
    a storage unit configured to store a setting table in which a set value for at least a part of zooming, focusing, image correction value, brightness, and contrast is associated with the image forming medium; and
    a processing unit configured to read the set value associated with the image forming medium from the setting table for setting a condition.

11. The spatial projection apparatus according to claim 10, further comprising:
    a multiplicity of the image forming medium having different characteristics,
    wherein the changing unit is configured so as to be driven to dispose one image forming medium selected from the multiplicity of the image forming media on an image forming effective area interposed between a light source of the projected light and the light guide optical system.

12. The spatial projection apparatus according to claim 10,
    wherein the image forming medium comprises a light transmitting member in which the projected light is shined on a first surface of the light transmitting member, and light is diffuse emitted towards the light guide optical system from a second surface of the light transmitting member opposite to the first surface.

13. The spatial projection apparatus according to claim 10,
    wherein the light guide optical system comprises a beam splitter and a retro-reflection member, and
    wherein the beam splitter is configured (i) to reflect light emitted from the image forming medium towards the retro-reflection member and (ii) to transmit light reflected by the retro-reflection member therethrough towards the aerial space image forming section.

14. A spatial projection apparatus comprising:
an image forming medium on which projected light is focused;
a changing unit configured to change a characteristic of the image forming medium; and
a light guide optical system configured to refocus the projected light emitted from the image forming medium on an aerial space image forming section,
wherein the light guide optical system comprises a beam splitter and a retro-reflection member, and
wherein the beam splitter is configured (i) to reflect light emitted from the image forming medium towards the retro-reflection member and (ii) to transmit light reflected by the retro-reflection member therethrough towards the aerial space image forming section.

15. The spatial projection apparatus according to claim 14, further comprising:
a storage unit configured to store a setting table in which a set value for at least a part of zooming, focusing, image correction value, brightness, and contrast is associated with the image forming medium; and
a processing unit configured to read the set value associated with the image forming medium from the setting table for setting a condition.

16. The spatial projection apparatus according to claim 15,
wherein the image correction value is set based on a captured image associated with a projected image projected on the image forming medium which is obtained by imaging the projected image.

17. The spatial projection apparatus according to claim 14,
wherein the image forming medium comprises a light transmitting member in which the projected light is shined on a first surface of the light transmitting member, and light is diffuse emitted towards the light guide optical system from a second surface of the light transmitting member opposite to the first surface.

* * * * *